A. F. DIETRICK.
POULTRY BROODER.
APPLICATION FILED FEB. 17, 1914.

1,099,788.

Patented June 9, 1914.
2 SHEETS—SHEET 1.

Witnesses
Frederick L. Fox.
K. Peacock

Inventor
Adolph F. Dietrick.
By Victor J. Evans.
Attorney

A. F. DIETRICK.
POULTRY BROODER.
APPLICATION FILED FEB. 17, 1914.

1,099,788.

Patented June 9, 1914.
2 SHEETS—SHEET 2.

Witnesses
Frederick L. Fog.
W. Peacock

Inventor
Adolph F. Dietrick.
By Victor J. Evans.
Attorney

COLUMBIA PLANOGRAPH CO., WASHINGTON, D. C.

UNITED STATES PATENT OFFICE.

ADOLPH F. DIETRICK, OF LINCOLN, ILLINOIS.

POULTRY-BROODER.

1,099,788.  Specification of Letters Patent.  Patented June 9, 1914.

Application filed February 17, 1914. Serial No. 819,220.

*To all whom it may concern:*

Be it known that I, ADOLPH F. DIETRICK, a citizen of the United States, residing at Lincoln, in the county of Logan and State of Illinois, have invented new and useful Improvements in Poultry-Brooders, of which the following is a specification.

This invention relates to poultry brooders and it consists in the novel features hereinafter described and claimed.

An object of the invention is to provide a brooder of simple structure the parts of which are compactly assembled whereby the brooder occupies but small space and the bottom may be positioned in close proximity to a floor or other support.

With the above object in view the brooder comprises a body having a partition extending transversely across the same and which divides the interior of the body into a brooder chamber and a nursery chamber. A heating drum is located in the brooder chamber and a lamp casing is attached to the side of the body above the bottom thereof and is adapted to hold a lamp which is arranged to discharge heat into the said drum. Means is provided for leading warm air from the lamp casing into the brooder chamber under a hood which is positioned over the drum. The said hood is spaced from the drum and flexible material depends from the edge of the hood to the floor of the body. The drum is provided in its interior with a horizontally disposed partition having baffle plates arranged above and below the same. The said plates are adapted to direct the heat to the edge portions of the drum whereby the drum is prevented from becoming too hot at its central portion.

Figure 1:
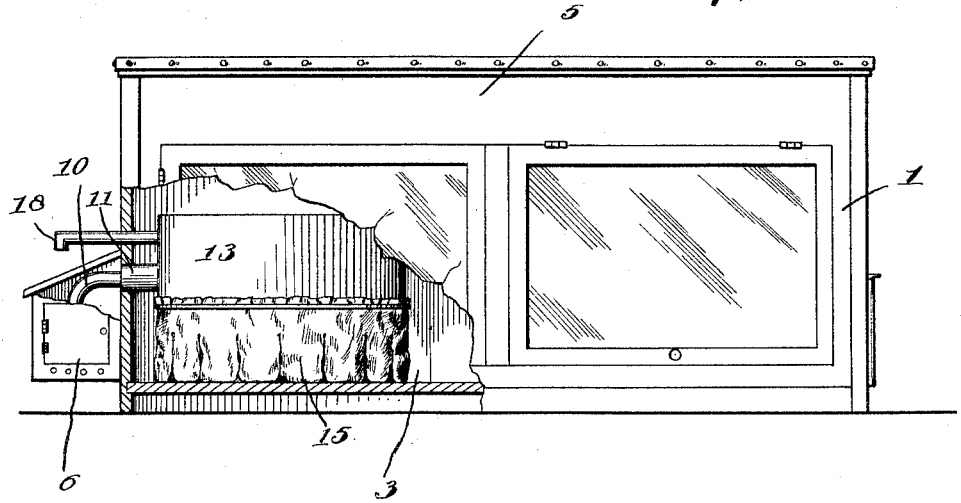
Figure 2:
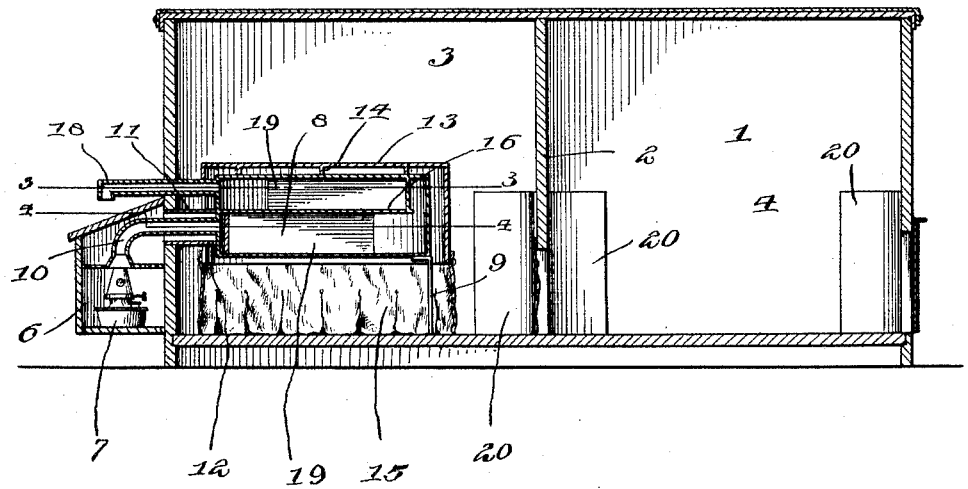
Figure 3:
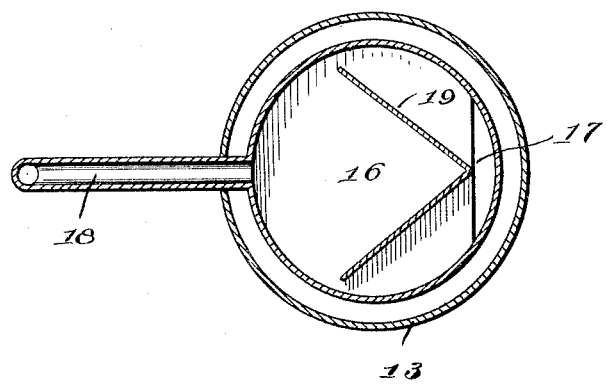
Figure 4:
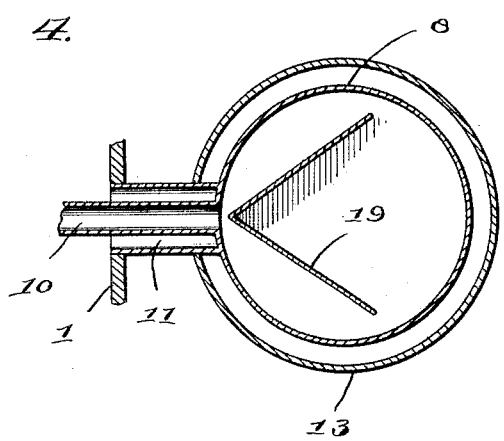
Figure 5:
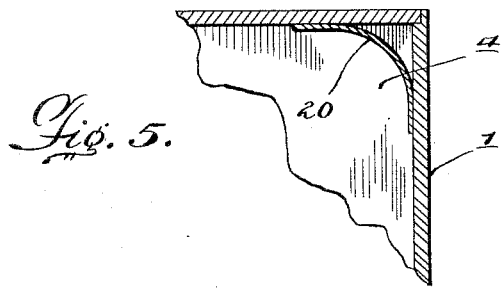

In the accompanying drawing:—Figure 1 is a side elevation of the brooder with parts removed. Fig. 2 is a transverse sectional view of the brooder. Fig. 3 is a sectional view of parts of the same cut on the line 3—3 of Fig. 2. Fig. 4 is a similar view cut on the line 4—4 of Fig. 2. Fig. 5 is a detailed sectional view of a corner portion of the brooder.

The brooder comprises a body 1 which is provided in its interior with a partition 2 which divides the body into a brooding chamber 3 and a nursery chamber 4. One side of the body 1 is closed by a removable panel 5 which may be provided with hinged doors having glass transparencies if desired.

A lamp casing 6 is attached to the side of the body 1 above the floor thereof and is adapted to hold a lamp 7. A drum 8 is located in the brooding chamber 3 and is supported at one side by means of a leg 9 which rests upon the floor of the body 1 and the said drum is provided at its opposite side portions with a pipe 10 which extends into the lamp casing 6 and which terminates over the upper end of the chimney of the lamp 7. A pipe 11 also passes through the side of the body 1 and is attached to the drum 8. The pipe 11 surrounds the inner portion of the pipe 10 but is spaced from the same and within the chamber 3 the pipe 11 is provided with an opening 12. The outer end portion of the pipe 11 enters the upper portion of the lamp casing 6.

A hood 13 is located over the drum 8 and is spaced from the same. The said hood 13 is provided at the under surface of its top with lugs 14 which rest upon the top of the said drum. A curtain 15 depends from the edge of the hood 13 and the lower portion of the said curtain rests upon the upper surface of the floor of the body 1. The curtain 15 is preferably of felt although it may be of any other suitable fabric or flexible material.

A horizontally disposed partition 16 is located in the drum 18 and the edge portion of the said partition 16 which is remote from the point of attachment between the drum 8 and the pipe 10 is spaced from the inner surface of the side of the drum leaving an opening 17. A pipe 18 is connected with the drum 8 at a point above the partition 16 and at the opposite side of the drum from the said opening 17 and the said pipe 18 passes through the side of the body 1. Baffle strips 19 are located within the drum 8 above and below the partition 16. These strips are approximately V-shaped in plan and the ends of the said strips are spaced from the side of the drum. The pointed portion of the strip 19 which is located below the partition 16 is disposed toward the inner end of the pipe 10 and the pointed portion of the strip 19 which is located above the partition 16 is disposed toward the opening 17.

The body 1 is provided at its corner portions with curved plates 20 which serve to prevent the chicks from being crowded into the corners of the body and smothered or injured.

In operation the heat from the lamp 7 passes through the pipe 10 into the lower portion of the drum 8 and strikes the pointed intermediate portions of the lowermost baffle strip 19. The said strip deflects the heat toward the edge or sides of the drum and when the heat passes around the ends of the said strip it passes up through the opening 17 into the space above the partition 16. Here the heat strikes the pointed portion of the uppermost baffle strip 19 and is again deflected toward the side or edge portions of the drum. After passing around the ends of the uppermost strips 19 the heat passes out of the drum 8 through the pipe 18. Thus it will be seen that the edge or side portions of the drum 8 are heated and the intermediate portions of the drum is prevented from becoming too hot. The chicks may assemble within the curtain 15 under the drum and consequently they are supplied with an ample quantity of heat. At the same time fresh warmed air may pass from the lamp casing 6 through the pipe 11 and the opening 12 thereof under the hood 13 and consequently the chicks will be supplied with fresh warmed air for breathing. The partition 2 may be provided with openings whereby the chicks may readily pass from the brooding chamber into the nursery and if desired the wall of the nursery 4 may be provided with an opening through which the chicks may pass from the body 1 to the exterior.

The advantages gained by the arrangement of parts as indicated is that the floor of the body 1 may be in close proximity to the floor or support upon which the body rests and the parts are compactly assembled and occupy but small space. Furthermore the location of the lamp 7 above the floor of the body 1 makes the said lamp accessible for observation and other purposes.

Having described the invention what is claimed is:—

A brooder comprising a body, a lamp casing attached to the side of the body, a drum located in the body, a pipe leading from the drum into the lamp casing, a hood located over the drum, a curtain depending from the hood, a partition located in the drum above the pipe and being provided with an opening at its edge portion remote from said pipe, an outlet pipe leading from the drum to the body and connected with the drum at the side thereof opposite the said opening, and V-shaped strips located in the drum above and below the partition the pointed end portion of the lowermost strip being disposed toward the first mentioned pipe and the pointed portion of the uppermost strip being disposed toward the opening in the partition.

In testimony whereof I affix my signature in presence of two witnesses.

ADOLPH F. DIETRICK.

Witnesses:
S. BARTHEL,
GEO. W. OHMES.

Copies of this patent may be obtained for five cents each, by addressing the "Commissioner of Patents, Washington, D. C."